(12) United States Patent
Kapner (10) Patent No.: US 9,683,869 B1
(45) Date of Patent: Jun. 20, 2017

(54) ELECTRONIC ABSOLUTE POSITION ENCODER

(71) Applicant: Mitutoyo Corporation, Kanagawa-ken (JP)

(72) Inventor: Daniel John Kapner, Seattle, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 11 days.

(21) Appl. No.: 14/966,379

(22) Filed: Dec. 11, 2015

(51) Int. Cl.
*G01B 7/30* (2006.01)
*G01B 7/14* (2006.01)
*G01D 5/20* (2006.01)

(52) U.S. Cl.
CPC ........................... *G01D 5/20* (2013.01)

(58) Field of Classification Search
CPC ........................................................ G01B 7/30
USPC ..................................................... 324/207.15
See application file for complete search history.

(56) References Cited

U.S. PATENT DOCUMENTS

| | | |
|---|---|---|
| 4,717,874 A | 1/1988 | Ichikawa et al. |
| 4,879,555 A | 11/1989 | Ichikawa et al. |
| 5,841,274 A | 11/1998 | Masreliez et al. |
| 5,886,519 A | 3/1999 | Masreliez et al. |
| 5,894,678 A | 4/1999 | Masreliez et al. |
| 5,973,494 A | 10/1999 | Masreliez et al. |
| 6,002,250 A | 12/1999 | Masreliez et al. |
| 6,011,389 A | 1/2000 | Masreliez et al. |
| 6,034,624 A | 3/2000 | Goto et al. |
| 6,977,594 B2 | 12/2005 | Hudman et al. |

*Primary Examiner* — Bot Ledynh
(74) *Attorney, Agent, or Firm* — Seed IP Law Group LLP (57) ABSTRACT

An electronic absolute position encoder comprises a scale, a detector and a signal processing configuration. The scale comprises a signal modulating scale pattern including a first periodic pattern component having a spatial wavelength $\lambda_1$, and a second periodic pattern component having a spatial wavelength $\lambda_2$. The detector comprises a set of first wavelength sensing elements comprising a first filtering subset of first wavelength sensing elements and a second filtering subset of first wavelength sensing elements including complementary pairs of sensing elements spaced apart by an integer number times 180 degrees of the spatial wavelength $\lambda_2$. The detector comprises a set of second wavelength sensing elements comprises a first filtering subset of second wavelength sensing elements and a second filtering subset of second wavelength sensing elements including complementary pairs of sensing elements spaced apart by an integer number times 180 degrees of the spatial wavelength $\lambda_1$.

20 Claims, 7 Drawing Sheets

| λ2/λ1 | λSyn/λ1 | Filter factor at λ1 | | | | |
|---|---|---|---|---|---|---|
| | | k=2 | k=4 | k=6 | k=8 | k=10 |
| 1.1 | 10 | 1.24 | 2.35 | 3.24 | 3.80 | 4.00 |
| 1.05 | 21 | 0.63 | 1.24 | 1.82 | 2.35 | 2.83 |
| 1.025 | 41 | 0.28 | 0.56 | 0.87 | 1.18 | 1.53 |
| 1.01 | 101 | 0.13 | 0.25 | 0.38 | 0.50 | 0.63 |

ELECTRONIC ABSOLUTE POSITION ENCODER

BACKGROUND

Technical Field

The invention relates generally to precision measurement instruments, and particularly to absolute position encoders.

Description of the Related Art

Various position transducers are available, such as optical, capacitive, and inductive transducers. These transducers may use a transmitter and a receiver in a read head to measure its movement relative to a scale. Some types of transducers are sensitive to contamination, such that using them in manufacturing or shop environments is impractical. In contrast, inductive sensors may be immune to contamination by particles, oil, water, and other fluids. U.S. Pat. No. 6,011,389 (the '389 patent), which is hereby incorporated herein by reference in its entirety, describes an induced current position transducer usable in high accuracy applications. U.S. Pat. No. 5,973,494 (the '494 patent) and U.S. Pat. No. 6,002,250 (the '250 patent), which are each hereby incorporated herein by reference in their entireties, describe incremental position inductive calipers and linear scales, including signal generating and processing circuits. U.S. Pat. Nos. 5,886,519, 5,841,274, and 5,894,678, which are each hereby incorporated herein by reference in their entireties, describe absolute position inductive calipers and electronic tape measures using the induced current transducer. As described in these patents, the induced current transducer may be readily manufactured using known printed circuit board technology.

Different implementations of the induced current transducer (and other types of transducers) may be implemented as either incremental or absolute position encoders. In general, incremental position encoders utilize a scale that allows the displacement of a read head relative to a scale to be determined by accumulating incremental units of displacement, starting from an initial point along the scale. However, in certain applications, such as those where encoders are used in low power consumption devices, it is more desirable to use absolute position encoders. Absolute position encoders provide a unique output signal, or combination of signals, at each position (of a read head) along a scale. They do not require continuous accumulation of incremental displacements in order to identify a position. Thus, absolute position encoders allow various power conservation schemes, amongst other advantages.

U.S. Pat. No. 6,034,624 discloses a scale with two periodic pattern components with two different wavelengths which may be suitable for an absolute position encoder. However, a detector disclosed in this reference may be subject to poor rotational misalignment tolerances since its receiver coils do not extend around the entire scale. Furthermore, if the receiver coils did extend around the entire track, the receiver coils would not be able to separate signal content corresponding to each of the two wavelengths. Improved configurations of absolute encoders that are robust against alignment errors would be desirable.

BRIEF SUMMARY

This summary is provided to introduce a selection of concepts in a simplified form that are further described below in the Detailed Description. The summary is not intended to identify key features of the claimed subject matter, nor is it intended to be used as an aid in determining the scope of the claimed subject matter.

An electronic absolute position encoder is provided that can be embodied, for example, in a high-precision electronic digital indicator, a caliper, a micrometer or a linear scale. The encoder comprises a scale extending along a measuring axis direction, a detector and a signal processing configuration that determines an absolute position of the detector along the scale based on detector signals provided by the detector. The scale includes a signal modulating scale pattern comprising a first periodic pattern component as a function of position along the scale having a spatial wavelength $\lambda_1$, and a second periodic pattern component as a function of position along the scale having a spatial wavelength $\lambda_2$. The detector comprises sensing elements arranged along the measuring axis direction. The sensing elements comprise a set of first wavelength sensing elements configured to provide a first set of detector signals which respond to the signal modulating scale pattern and a set of second wavelength sensing elements configured to provide a second set of detector signals which respond to the signal modulating scale pattern. The set of first wavelength sensing elements comprises a first filtering subset of first wavelength sensing elements that each span across the first and second pattern components and a second filtering subset of first wavelength sensing elements that each span across the first and second pattern components. The first and second filtering subsets of the set of first wavelength sensing elements are arranged such that each sensing element of the first filtering subset forms a complementary pair with a sensing element in the second filtering subset that is spaced apart from it along the measuring axis direction by an integer number times 180 degrees of spatial phase difference in terms of the spatial wavelength $\lambda_2$. The set of second wavelength sensing elements comprises a first filtering subset of second wavelength sensing elements that each span across the first and second pattern components and a second filtering subset of second wavelength sensing elements that each span across the first and second pattern components. The first and second filtering subsets of the set of second wavelength sensing elements are arranged such that each sensing element of the first filtering subset forms a complementary pair with a sensing element in the second filtering subset that is spaced apart from it along the measuring axis direction by an integer number times 180 degrees of spatial phase difference in terms of the spatial wavelength $\lambda_1$.

DETAILED DESCRIPTION

Figure 1:
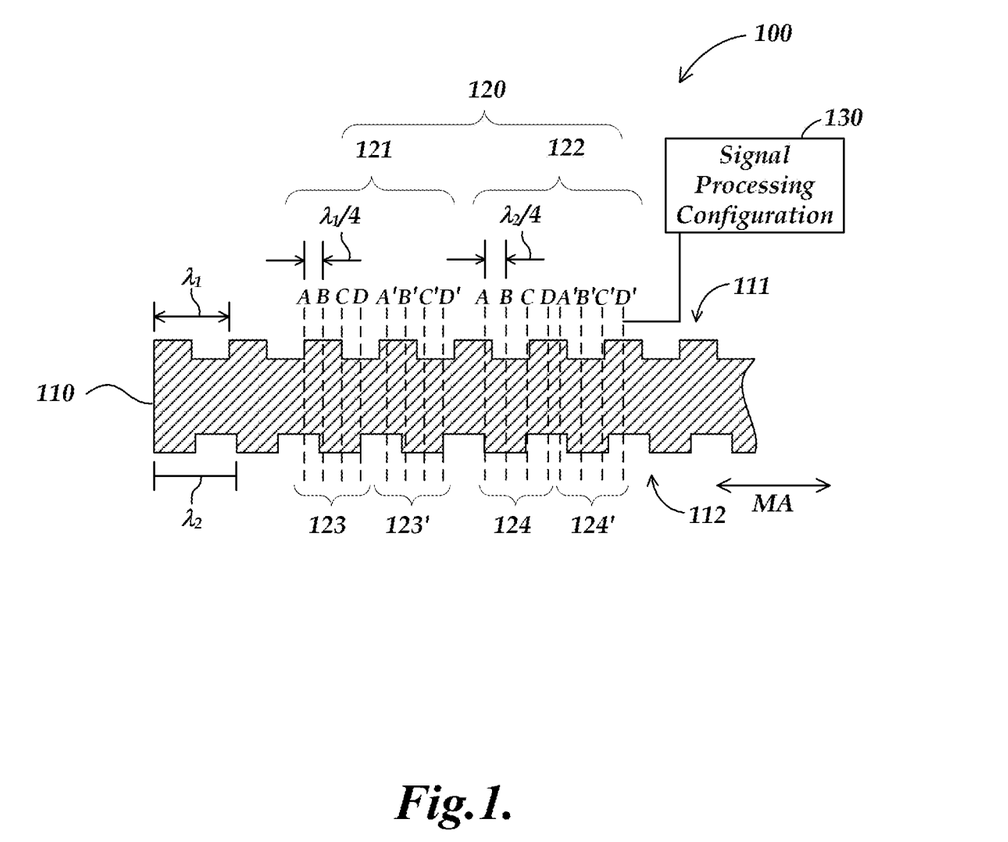
FIG. 1 is a schematic diagram of a first embodiment of an electronic absolute position encoder.

FIG. 1 is a schematic diagram of a first embodiment of an electronic absolute position encoder 100. The electronic absolute position encoder 100 comprises a scale 110 extending along a measuring axis direction MA, a detector 120, and signal processing configuration 130 that determines an absolute position of the detector 120 along the scale 110 based on detector signals provided by the detector 120. The scale 110 includes a signal modulating scale pattern comprising first periodic pattern component 111 as a function of position along the scale 110 having a spatial wavelength $\lambda_1$, and a second periodic pattern component 112 as a function of position along the scale 110 having a spatial wavelength $\lambda_2$. The scale 110 comprises a cylindrical shape having a cylinder axis aligned parallel to the measuring axis direction with the first periodic pattern component 111 formed as notches or grooves arranged on one side and the second periodic pattern component 112 formed as notches or grooves arranged on the other side. The scale 110 may be formed from materials such as aluminum or steel. The detector 120 comprises sensing elements arranged along the measuring axis direction MA. The sensing elements comprise loops which encircle the scale. The sensing elements comprise a set of first wavelength sensing elements 121 configured to provide a first set of detector signals which respond to the signal modulating scale pattern, and a set of second wavelength sensing elements 122 which respond to the signal modulating scale pattern. The set of first wavelength sensing elements 121 comprises a first filtering subset of first wavelength sensing elements 123 that each span across the first and second pattern components 111 and 112, and a second filtering subset of first wavelength sensing elements 123' that each span across the first and second pattern components 111 and 112. The first and second filtering subsets 123 and 123' of the set of first wavelength sensing elements 121 are arranged such that each sensing element of the first filtering subset 123 forms a complementary pair with a sensing element in the second filtering subset 123' that is spaced apart from it along the measuring axis direction MA by an integer number times 180 degrees of spatial phase difference in terms of the spatial wavelength $\lambda_2$. Each wavelength sensing element is marked as a dashed line for simplicity. The set of second wavelength sensing elements 122 comprises a first filtering subset of second wavelength sensing elements 124 that each span across the first and second pattern components 111 and 112 and a second filtering subset of second wavelength sensing elements 124' that each span across the first and second pattern components 111 and 112. The first and second filtering subsets 124 and 124' of the set of second wavelength sensing elements are arranged such that each sensing element of the first filtering subset 124 forms a complementary pair with a sensing element in the second filtering subset 124' that is spaced apart from it along the measuring axis direction MA by an integer number times 180 degrees of spatial phase difference in terms of the spatial wavelength $\lambda_1$. In various embodiments, the sensing elements of the detector comprise electromagnetic windings which are configured to provide detector signals that are responsive to a change in inductance (measured as impedance) sensed by the electromagnetic windings as a function of position along the signal modulating scale pattern.

The detector 120 and the scale 110 are configured as an eddy current transducer which operates in one implementation by generating changing magnetic fields. The changing magnetic fields, which may be provided in some embodiments by providing a changing current in each wavelength sensing element, to induce circulating currents, known as eddy currents, in the scale 110 which vary according to the thickness of material in the scale 110 along the first periodic pattern component 111 and the second periodic pattern component 112. The effective inductances of the wavelength sensing elements of the detector 120 are influenced by the respective eddy currents to correspondingly provide absolute position detector signals having a signal characteristic that varies along an absolute signal range of the scale 110 to uniquely indicate respective positions of the detector 120 along the absolute signal range. Alternatively, an electric absolute position encoder configured according to the principles disclosed herein may utilize a transformer type of architecture similar to that disclosed in the '389 patent, which comprises transmitter and receiver windings arranged in a fashion similar to sensing elements of the detector 120.

A signal provided by a single wavelength sensing element as a function of a position x along the measuring axis direction MA may be modeled as a sum of fundamental signals, second harmonics and a constant offset:

$$L = L_1 \sin\left(\frac{2\pi x}{\lambda_1} + \theta_1\right) + L_2 \sin\left(\frac{2\pi x}{\lambda_2} + \theta_2\right) + \\ L_3 \sin\left(\frac{2\pi x}{0.5\lambda_1} + \theta_3\right) + L_4 \sin\left(\frac{2\pi x}{0.5\lambda_1} + \theta_3\right) + \beta \quad (1)$$

The $L_1$ and $L_2$ terms are respective fundamental signals of the first wavelength $\lambda_1$ and the second wavelength $\lambda_2$ having respective phase offsets $\theta_1$ and $\theta_2$. The $L_3$ and $L_4$ terms are respective second harmonics of the first wavelength $\lambda_1$ and the second wavelength $\lambda_2$ having respective phase offsets $\theta_3$ and $\theta_4$. The $\beta$ term is a constant offset.

Figure 7:
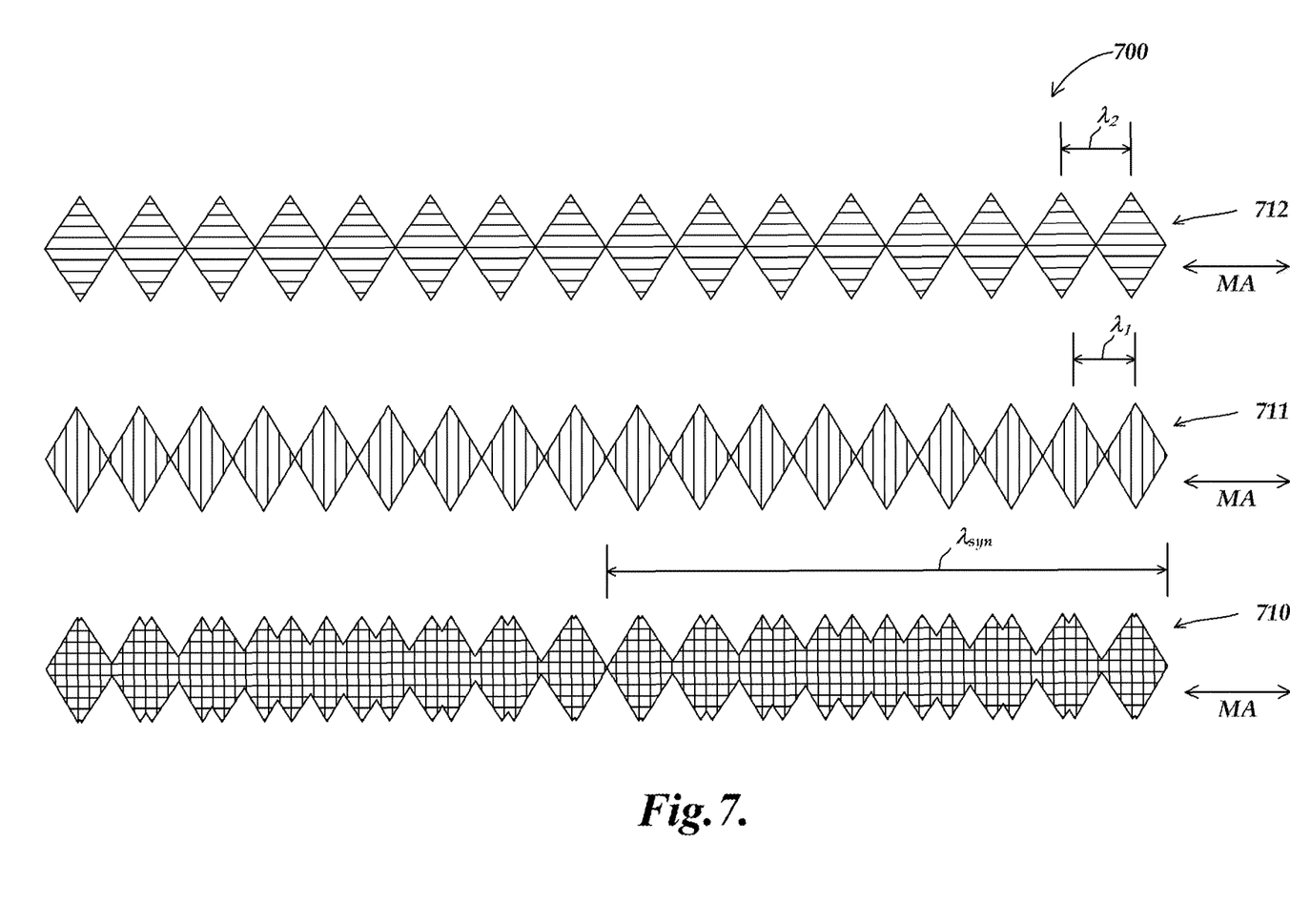
FIG. 7 is a schematic diagram showing the construction of a scale which may be used in a second embodiment of an electronic absolute position encoder.

It should be appreciated that the scale 110 is a cylindrical shape suitable to be constructed on a shaft of an electronic indicator gage. However, a similar structure may be utilized in a flat arrangement, e.g., as shown in FIG. 7.

In some embodiments configured according to the principles disclosed herein, the signal processing configuration 130 may be configured to process the first set of detector signals to provide first wavelength spatial phase measurement signals wherein signal components due to the second periodic pattern component 112 (e.g., the $L_2$ and $L_4$ terms of Equation 1) are suppressed, and to process the second set of detector signals to provide second wavelength spatial phase measurement signals wherein signal components due to the first periodic pattern component 111 (e.g., the $L_1$ and $L_3$ terms of Equation 1) are suppressed. In some embodiments, the signal processing configuration 130 may be configured to process the first wavelength spatial phase measurement signals and determine a spatial phase measurement for the set of first wavelength sensing elements 121 relative to the spatial wavelength $\lambda_1$, and to process the second wavelength spatial phase measurement signals and determine a spatial phase measurement for the set of second wavelength sensing elements 122 relative to the spatial wavelength $\lambda_2$.

Figure 2A:
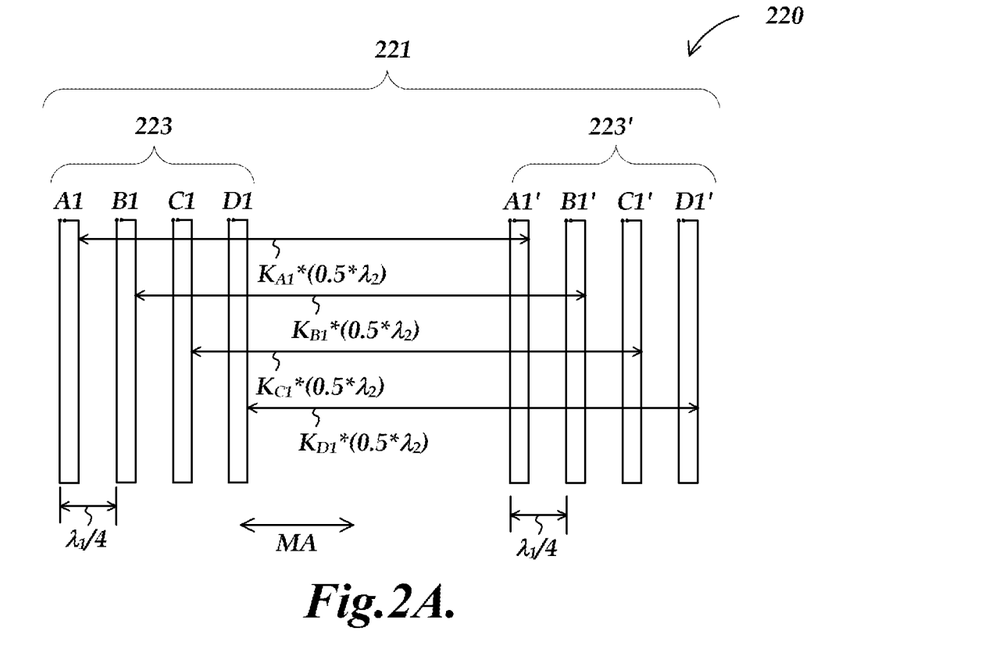
FIG. 2A is a schematic diagram of a set of first wavelength sensing elements of a detector which may be used in the electronic absolute position encoder of FIG. 1.

FIG. 2A is a schematic diagram of a set of first wavelength sensing elements 221 of a detector 220 which may be used in the electronic absolute position encoder 100, showing additional detail. The set of first wavelength sensing elements 221 comprises a first filtering subset of first wavelength sensing elements 223 and a second filtering subset of first wavelength sensing elements 223'. As shown in FIG. 2A, the first filtering subset of first wavelength sensing elements 223 comprises sensing elements configured to sample phase positions A1, B1, C1, and D1 along the measuring axis direction MA. More specifically, the phase signals A1, B1, C1, and D1 correspond to relative phase positions of 0, 90, 180 and 270 degrees with respect to the first wavelength $\lambda_1$. The second filtering subset of first wavelength sensing elements 224' comprises sensing elements configured to sample phases A1', B1', C1', and D1' along the measuring axis direction MA. More specifically, the phase signals A1', B1', C1', and D1' correspond to relative phase positions of 0, 90, 180 and 270 degrees with respect to the first wavelength $\lambda_1$. The first filtering subset of first wavelength sensing elements 223 is arranged such that each sensing element of the first filtering subset 223 forms a complementary pair with a sensing element in the second filtering subset 223' that is spaced apart from it along the measuring axis direction MA by an integer number times 180 degrees of spatial phase difference in terms of the second spatial wavelength $\lambda_2$. More specifically, A1 and A1' are a complementary pair spaced apart by a distance $K_{A1}*(0.5*\lambda_2)$ along the measuring axis direction MA, B1 and B1' are a complementary pair spaced apart by a distance $K_{B1}*(0.5*\lambda_2)$ along the measuring axis direction MA, C1 and C1' are a complementary pair spaced apart by a distance $K_{C1}*(0.5*\lambda_2)$ along the measuring axis direction MA, and D1 and D1' are a complementary pair spaced apart by a distance $K_{D1}*(0.5*\lambda_2)$ along the measuring axis direction MA. The values $K_{A1}$, $K_{B1}$, $K_{C1}$ and $K_{D1}$ are integers. In the embodiment illustrated in FIG. 2A, the values $K_{A1}$, $K_{B1}$, $K_{C1}$ and $K_{D1}$ are all equal to 2, although it should be appreciated that this value is exemplary and not limiting. Furthermore, the values $K_{A1}$, $K_{B1}$, $K_{C1}$ and $K_{D1}$ do not have to be the same value.

In order to provide a signal that corresponds to a first wavelength phase $\phi_1$, the signals for each complementary pair may be added either electronically or mathematically in the signal processing configuration 130. This provides quadrature signals $\overline{A1}$, $\overline{B1}$, $\overline{C1}$ and $\overline{D1}$ given by the expressions:

$$\overline{A1} = A1 \pm A1' \quad (2)$$

$$\overline{B1} = B1 \pm B1' \quad (3)$$

$$\overline{C1} = C1 \pm C1' \quad (4)$$

$$\overline{D1} = D1 \pm D1' \quad (5)$$

For even values of $K_{A1}$, $K_{B1}$, $K_{C1}$ and $K_{D1}$, the differences may be used and for odd values the sums may be used in Equations 2-5. The quadrature signals $\overline{A1}$, $\overline{B1}$, $\overline{C1}$ and $\overline{D1}$ may then be used to determine the first wavelength phase $\phi_1$ by the expression:

$$\phi_1 = \tan^{-1} \frac{\overline{A1} - \overline{C1}}{\overline{B1} - \overline{D1}} \quad (6)$$

It should be appreciated that by spacing the complementary pairs apart by an integer number times 180 degrees of spatial phase difference in terms of the second spatial wavelength $\lambda_2$, determining each of the quadrature signals $\overline{A1}$, $\overline{B1}$, $\overline{C1}$ and $\overline{D1}$ subtracts out common mode values corresponding to the spatial wavelength $\lambda_2$. More specifically, for even values of $K_{A1}$, $K_{B1}$, $K_{C1}$ and $K_{D1}$, the signals provided by each complementary pair have the same respective phases with respect to the second wavelength $\lambda_2$, and for odd values of $K_{A1}$, $K_{B1}$, $K_{C1}$ and $K_{D1}$, the signals provided by each complementary pair have opposite respective phases with respect to the second wavelength $\lambda_2$.

Figure 2B:
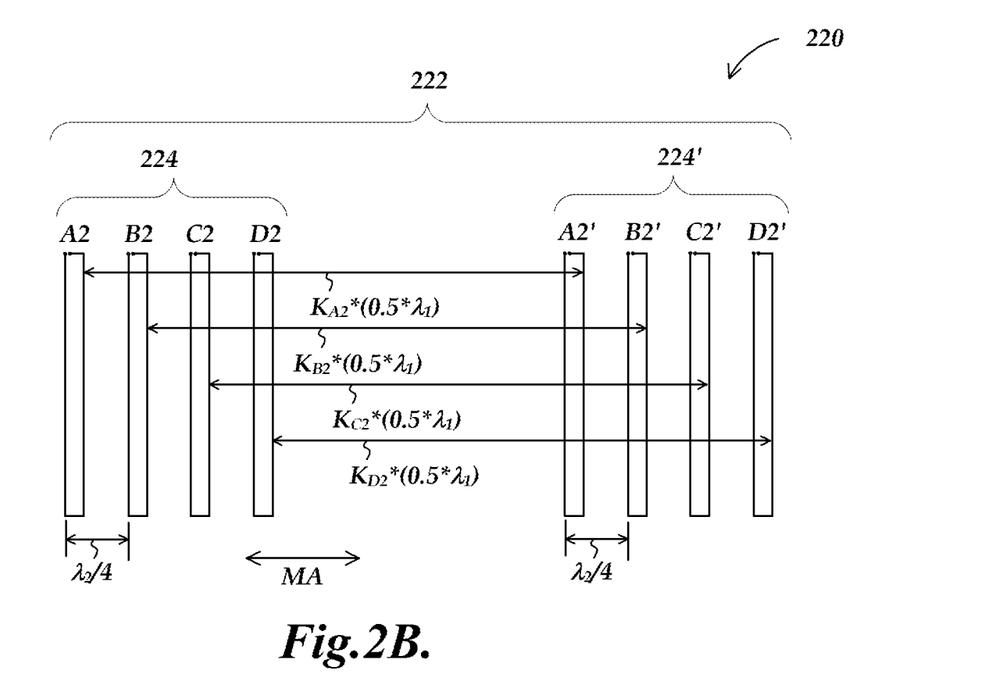
FIG. 2B is a schematic diagram of a set of second wavelength sensing elements of a detector which may be used in the electronic absolute position encoder of FIG. 1.

FIG. 2B is a schematic diagram of a set of second wavelength sensing elements 222 of a detector 220 which may be used in the electronic absolute position encoder 100, showing additional detail. The set of second wavelength sensing elements 222 comprises a first filtering subset of second wavelength sensing elements 224 and a second filtering subset of second wavelength sensing elements 224'. As shown in FIG. 2B, the first filtering subset of second wavelength sensing elements 224 comprises sensing elements configured to sample phase positions A2, B2, C2, and D2 along the measuring axis direction MA. More specifically, the phase signals A2, B2, C2, and D2 correspond to relative phase positions of 0, 90, 180 and 270 degrees with respect to the first wavelength $\lambda_2$. The second filtering subset of second wavelength sensing elements 224' comprises sensing elements configured to sample phases A2', B2', C2', and D2' along the measuring axis direction. More specifically, the phase signals A2', B2', C2', and D2' correspond to relative phase positions of 0, 90, 180 and 270 degrees with respect to the first wavelength $\lambda_2$. The first filtering subset of second wavelength sensing elements 224 is arranged such that each sensing element of the first filtering subset 224 forms a complementary pair with a sensing element in the second filtering subset 224' that is spaced apart from it along the measuring axis direction by an integer number times 180 degrees of spatial phase difference in terms of the first spatial wavelength $\lambda_1$. More specifically, A2 and A2' are a complementary pair spaced apart by a distance $K_{A2}*(0.5\lambda_2)$ along the measuring axis direction MA, B2 and B2' are a complementary pair spaced apart by a distance $K_{B2}*(0.5*\lambda_2)$ along the measuring axis direction MA, C2 and C2' are a complementary pair spaced apart by a distance $K_{C2}*(0.5*\lambda_2)$ along the measuring axis direction MA, and D2 and D2' are a complementary pair spaced apart by a distance $K_{D2}*(0.5*\lambda_2)$ along the measuring axis direction MA. The values $K_{A2}$, $K_{B2}$, $K_{C2}$ and $K_{D2}$ are integers. In the embodiment illustrated in FIG. 2A, the values $K_{A2}$, $K_{B2}$, $K_{C2}$ and $K_{D2}$ are all equal to 2, although it should be appreciated that this value is exemplary and not limiting. Furthermore, the values $K_{A2}$, $K_{B2}$, $K_{C2}$ and $K_{D1}$ do not have to be the same value.

In order to provide a signal that corresponds to a first wavelength phase $\phi_2$, the signals for each complementary pair may be added either electronically or mathematically in the signal processing configuration 130. This provides quadrature signals $\overline{A2}$, $\overline{B2}$, $\overline{C2}$ and $\overline{D2}$ given by the expressions:

$$\overline{A2} = A2 \pm A2' \quad (7)$$

$$\overline{B2} = B2 \pm B2' \quad (8)$$

$$\overline{C2} = C2 \pm C2' \quad (9)$$

$$\overline{D2} = D2 \pm D2' \quad (10)$$

For even values of $K_{A2}$, $K_{B2}$, $K_{C2}$ and $K_{D2}$, the differences may be used and for odd values the sums may be used in Equations 7-10. The quadrature signals $\overline{A2}$, $\overline{B2}$, $\overline{C2}$ and $\overline{D2}$ may then be used to determine the first wavelength phase $\phi_2$ by the expression:

$$\phi_2 = \tan^{-1} \frac{\overline{A2} - \overline{C2}}{\overline{B2} - \overline{D2}} \quad (11)$$

It should be appreciated that by spacing the complementary pairs apart by an integer number times 180 degrees of spatial phase difference in terms of the spatial wavelength $\lambda_2$, determining each of the quadrature signals $\overline{A2}$, $\overline{B2}$, $\overline{C2}$ and $\overline{D2}$ subtracts out common mode values corresponding to the first spatial wavelength $\lambda_1$. More specifically, for even values of $K_{A2}$, $K_{B2}$, $K_{C2}$ and $K_{D2}$, the signals provided by each complementary pair have the same respective phases with respect to the first wavelength $\lambda_1$, and for odd values of $K_{A2}$, $K_{B2}$, $K_{C2}$ and $K_{D2}$, the signals provided by each complementary pair have opposite respective phases with respect to the first wavelength $\lambda_1$.

The spatial phase difference between the analog signals provided by wavelength sensing elements of the first periodic pattern component 111 and the second periodic pattern component 112 changes by 360 degrees over a distance that is proportional to the product of the wavelengths $\lambda_1$ and $\lambda_2$ and inversely proportional to the absolute value of their difference. This distance may be referred to as a synthetic wavelength $\lambda_{syn}$, which is approximately the absolute measurement range of the electronic absolute position encoder 100. More specifically, the value of the synthetic wavelength $\lambda_{syn}$ may be given by the expression:

$$\lambda_{syn} = \frac{\lambda_1 \lambda_2}{|\lambda_2 - \lambda_1|} \quad (12)$$

The phase difference between respective signals from the first periodic pattern component 111 and the second periodic pattern component 112 can be used in conjunction with the known synthetic wavelength $\lambda_{syn}$ to determine the absolute position.

In some embodiments, a typical first wavelength $\lambda_1$ may be 2 mm and a typical second wavelength $\lambda_2$ may be 2.308 mm, which provides a synthetic wavelength $\lambda_{syn}$ which is 15 mm.

Figure 6A:
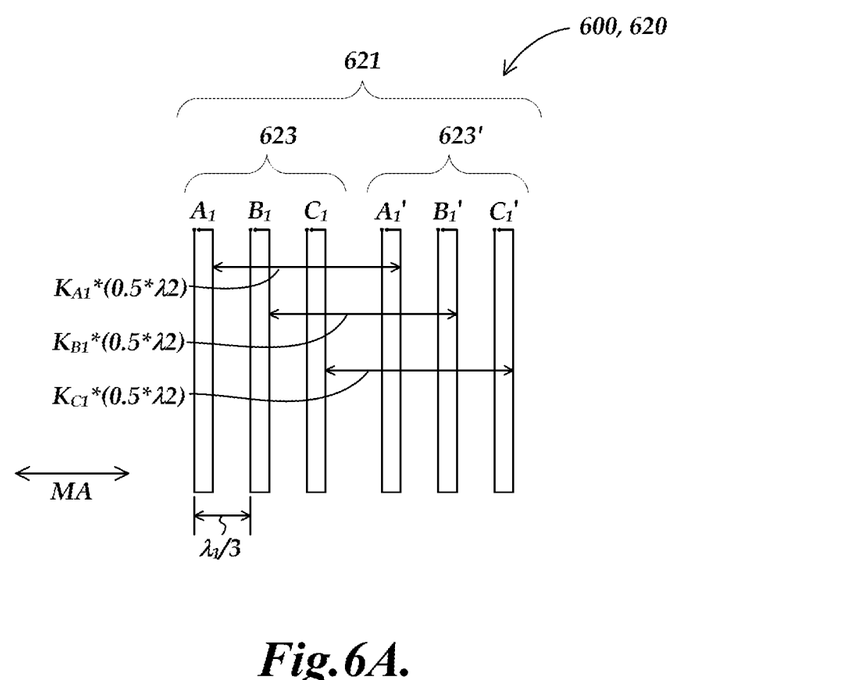
FIG. 6A is a schematic diagram of a set of first wavelength sensing elements of a detector which may be used in an electronic absolute position encoder.
Figure 6B:
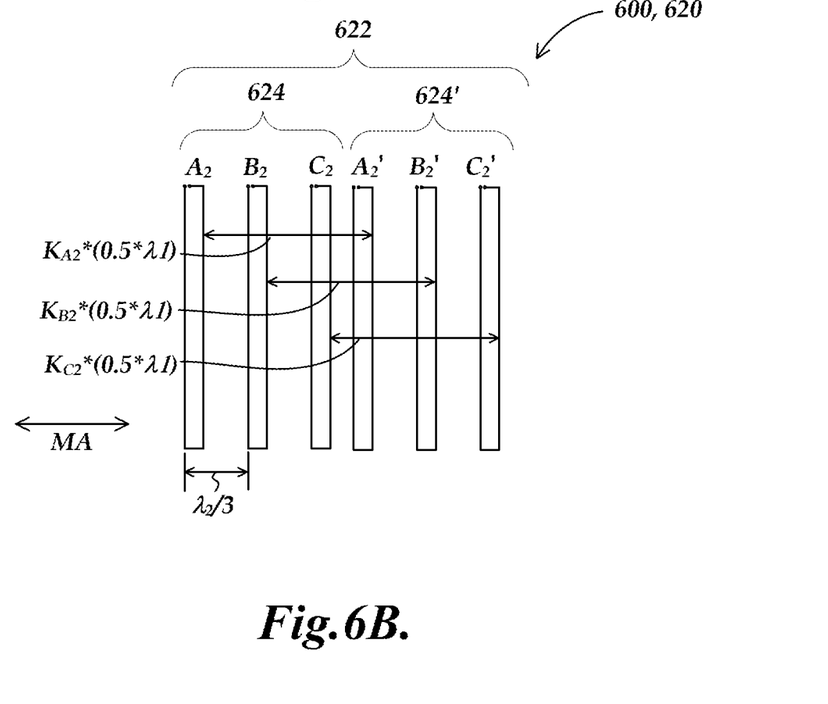
FIG. 6B is a schematic diagram of a set of second wavelength sensing elements of the detector shown in FIG. 6A.

In some embodiments configured according to the principles disclosed herein, a set of first wavelength sensing elements may be configured to provide detector signals corresponding to N spatial phases spaced apart at 360/N degrees of spatial phase difference in terms of the spatial wavelength $\lambda_1$. A set of second wavelength sensing elements may be configured to provide detector signals comprising a second set of N detector signals corresponding to N unique spatial phases spaced apart at 360/N degrees of spatial phase difference in terms of the spatial wavelength $\lambda_2$. For example, in the embodiment shown in FIG. 2A and FIG. 2B, the set of first wavelength sensing elements 221 is configured to provide detector signals comprising a first set of 4 detector signals corresponding to 4 spatial phases spaced apart at 90 degrees of spatial phase difference in terms of the spatial wavelength $\lambda_1$ and the set of second wavelength sensing elements 222 is configured to provide detector signals comprising a second set of 4 detector signals corresponding to 4 unique spatial phases spaced apart at 90 degrees of spatial phase difference in terms of the spatial wavelength $\lambda_2$. In this case, N=4. An alternative "3 phase" system is shown in FIGS. 6A and 6B, wherein N=3.

In some embodiments, sensing elements of the first subset of first wavelength sensing elements may be spaced a distance $\lambda_1/N$ apart and sensing elements of the first subset of second wavelength sensing elements may be spaced a distance $\lambda_2/N$ apart. For example, in the embodiment shown in FIGS. 2A and 2B, the first subset of first wavelength sensing elements comprises sensing elements spaced $\lambda_1/4$ apart and the first subset of second wavelength sensing elements comprises sensing elements spaced $\lambda_2/4$ apart. In other embodiments employing a three phase encoder, the first subset of first wavelength sensing elements comprises sensing elements spaced $\lambda_1/3$ apart and the first subset of second wavelength sensing elements comprises sensing elements spaced $\lambda_2/3$ apart. It should be appreciated that in alternative embodiments, sensing elements may comprise windings which are wider than $\lambda_1/4$ or $\lambda_2/4$, in which case a wider spacing may be required. For example, U.S. Pat. No. 9,612,136 (Ser. No. 14/871,386, filed Sep. 30, 2015, which is hereby incorporated by reference in its entirety, discloses a four phase encoder comprising a scale and a detector including spatial phase sensing elements which are separated by three fourths of a spatial wavelength of the scale.

Figure 3A:
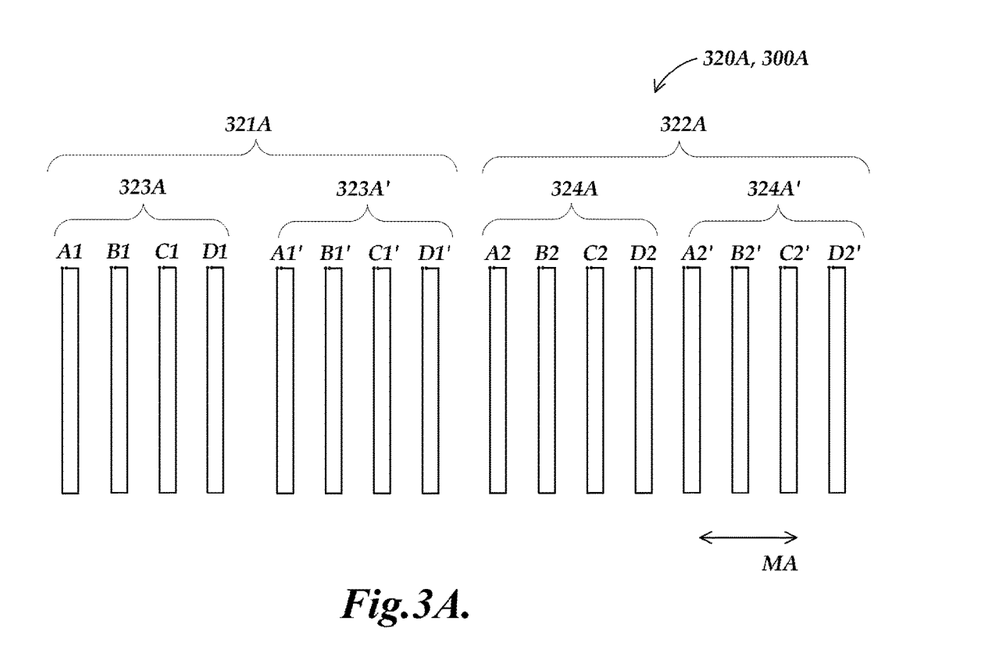
FIG. 3A is a schematic diagram of a detector which may be used in an electronic absolute position encoder.

FIG. 3A is a schematic diagram of a detector 320A which may be used in an electronic absolute position encoder 300A which is similar to the electronic absolute position encoder 100. More specifically, the detector 320A is a serial arrangement of a set of first wavelength sensing elements 321A and a set of second wavelength sensing elements 322A. The set of first wavelength sensing elements 321A comprises a first filtering subset of first wavelength sensing elements 323A and a second filtering subset of first wavelength sensing elements 323A'. The set of second wavelength sensing elements 322A comprises a first filtering subset of second wavelength sensing elements 324A and a second filtering subset of second wavelength sensing elements 324A'.

Figure 3B:
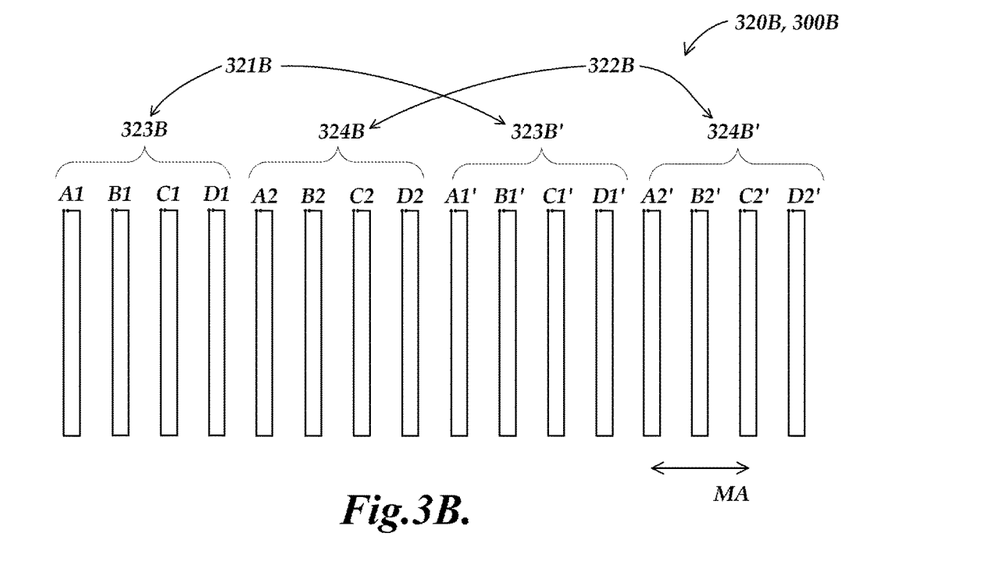
FIG. 3B is a schematic diagram of a detector which may be used in an electronic absolute position encoder.

FIG. 3B is a schematic diagram of a detector 320B which may be used in an electronic absolute position encoder 300B which is similar to the electronic absolute position encoder 100. More specifically, the detector 320B is an interleaved arrangement of a set of first wavelength sensing elements 321B and a set of second wavelength sensing elements 322B. The set of first wavelength sensing elements 321B comprises a first filtering subset of first wavelength sensing elements 323B and a second filtering subset of first wavelength sensing elements 323B'. The set of second wavelength sensing elements 322B comprises a first filtering subset of second wavelength sensing elements 324B and a second filtering subset of second wavelength sensing elements 324B'. The first filtering subset of second wavelength sensing elements 324B is arranged between the first filtering subset of first wavelength sensing elements 323B and the second filtering subset of first wavelength sensing elements 324B' along the measuring axis direction MA.

The detector 320B may be preferable in embodiments in which the values $K_{D2}$, $K_{B1}$, $K_{C1}$, $K_{D1}$, $K_{A2}$, $K_{B2}$, $K_{D2}$ and $K_{D2}$ are large. More specifically, this occurs in embodiments in which the set of first wavelength sensing elements 321B has a wide spacing between the first filtering subset of first wavelength sensing elements 323B and the second filtering subset of first wavelength sensing elements 323B' and in which the set of second wavelength sensing elements 322B has a wide spacing between the first filtering subset of second wavelength sensing elements 324B and the second filtering subset of second wavelength sensing elements 324B'. In such cases, an interleaved arrangement may provide a more compact detector 320B.

Figure 4:
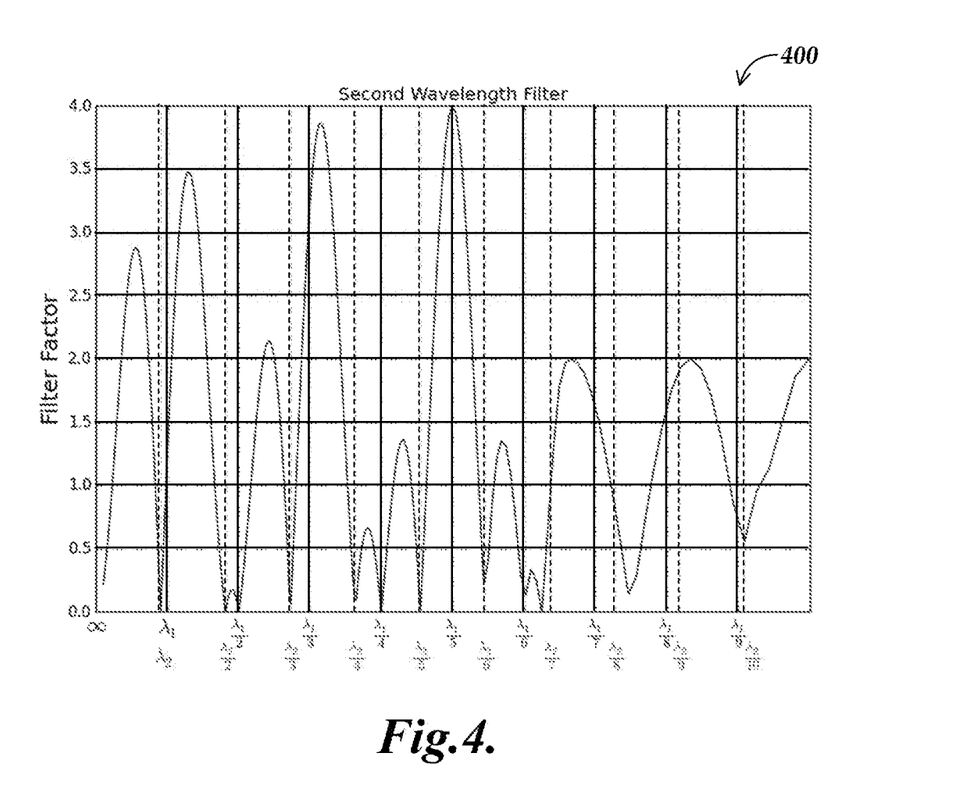
FIG. 4 is a chart showing a filter factor of a detector in response to spatial wavelengths along a scale in an electronic absolute encoder.

FIG. 4 is a chart 400 showing a filter factor of a detector configured to detect a first wavelength $\lambda_1$ in response to spatial wavelengths along a scale in a four phase electronic absolute encoder such as the electronic absolute encoder 100. More specifically, the filter factor may be understood as a transfer function representative of the spatial filtering of various spatial wavelengths of a scale between complementary pairs of sensing elements in a set of first wavelength sensing elements such as the set of first wavelength sensing elements 221. As shown in FIG. 4, at the second spatial wavelength $\lambda_2$, the filter factor is zero, or more specifically, the spatial wavelength $\lambda_2$ is fully attenuated such that it does not contribute to determination of the first wavelength phase $\phi_1$ in the quadrature relationship expressed by Equation 6. At the first spatial wavelength $\lambda_1$, the filter factor is approximately 1.25. At the second harmonic of both the first spatial wavelength $\lambda_1$ and the second spatial wavelength $\lambda_2$ (i.e., $\lambda_1/2$ and $\lambda_2/2$), the filter factor is zero, or more specifically, the second harmonic of both the first periodic pattern component 111 and second periodic pattern component 112 are fully attenuated.

Figure 5:
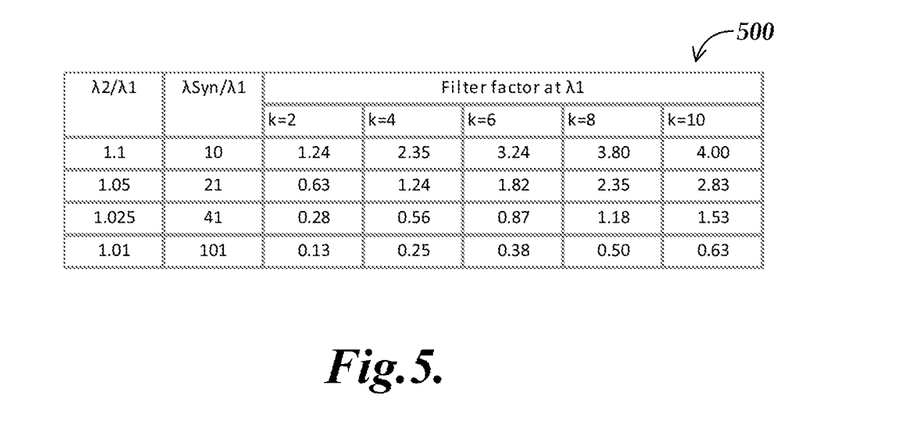
FIG. 5 is a chart showing filter factors and synthetic spatial wavelengths for various combinations of wavelengths of a first signal modulating scale pattern and a second signal modulating scale pattern of a scale in an electronic absolute encoder.

FIG. 5 is a chart 500 showing filter factors and synthetic spatial wavelengths $\lambda_{syn}$ for various combinations of wavelengths of a first periodic pattern component and a second periodic pattern component of a scale in a four phase electronic absolute encoder, as well as for various degrees of separation between complementary pairs of sensing elements represented by even integer values of k. The filter factors pertain to a set of first wavelength sensing elements such as the set of first wavelength sensing elements 221. The value k may be understood as analogous to the values $K_{A1}$, $K_{B1}$ $K_{C1}$, and $K_{D1}$. It should be appreciated that the filter factor at $\lambda_1$ depends on the value of k and the ratio of $\lambda_2/\lambda_1$. Different combinations of these values may give a better filter factor for $\lambda_1$ while still completely attenuating the wavelengths $\lambda_2$, $\lambda_2/2$ and $\lambda_1/2$. For a given value of the ratio $\lambda_2/\lambda_1$, a higher value of k gives a higher filter factor. For example, for a scale with a ratio $\lambda_2/\lambda_1=1.1$, a value of k=2 provides a filter factor of 1.24. Increasing the value of k=2 to k=4 for the same ratio $\lambda_2/\lambda_1$ provides a filter factor of 2.35.

For a given k value, a higher value of the ratio $\lambda_2/\lambda_1$ gives a higher filter factor. However, a smaller value of the ratio $\lambda_2/\lambda_1$ gives a larger absolute range, as expressed by the ratio $\lambda_{syn}/\lambda_1$. For example, for a value of the ratio $\lambda_2/\lambda_1$ which is 1.1, and a k value which is 2, the filter factor is 1.24 and the ratio $\lambda_{syn}/\lambda_1$ is 10. For a value of the ratio $\lambda_2/\lambda_1$ which is 1.05, and a k value which is 2, the filter factor is 0.63 and the ratio $\lambda_{syn}/\lambda_1$ is 21.

FIG. 6A is a schematic diagram of a set of first wavelength sensing elements 621 of a detector 620 which may be used in an electronic absolute position encoder 600. The electronic absolute position encoder 600 is a three phase encoder. The set of first wavelength sensing elements 621 comprises a first filtering subset of first wavelength sensing elements 623 that each span across the first and second pattern components 111 and 112, and a second filtering subset of first wavelength sensing elements 623' that each span across the first and second pattern components 111 and 112. As shown in FIG. 6A, the first filtering subset of first wavelength sensing elements 623 comprises sensing elements configured to sample phase signals $A_1$, $B_1$, and $C_1$ along the measuring axis direction. More specifically, the phase signals $A_1$, $B_1$, and $C_1$ correspond to 0, 120 and 240 degrees with respect to the first wavelength $\lambda_1$. The second filtering subset of first wavelength sensing elements 623' comprises sensing elements configured to sample phase signals $A_1'$, $B_1'$, and $C_1'$ along the measuring axis direction. More specifically, the phase signals $A_1'$, $B_1'$, and $C_1'$ correspond to 0, 120 and 240 degrees with respect to the first wavelength $\lambda_1$. The first filtering subset of first wavelength sensing elements 623 and the second filtering subset of first wavelength sensing elements 623' comprise sensing elements spaced distance $\lambda_1/3$ apart. The phase signals $A_1$, $B_1$, $C_1$, $A_1'$, $B_1'$, and $C_1'$ may be combined to provide three combined phase signals $\alpha_1$, $\beta_1$ and $\gamma_1$ according to the relations:

$$\alpha_1 = A_1 - A_1' \quad (13)$$

$$\beta_1 = B_1 - B_1' \quad (14)$$

$$\gamma_1 = C_1 - C_1' \quad (15)$$

The three combined phase signals may be used to provide three star configuration signals $S_{\alpha\beta1}$, $S_{\beta\gamma1}$ and $S_{\gamma\alpha1}$ according to the relations:

$$S_{\alpha\beta1} = \alpha_1 - \beta_1 \quad (16)$$

$$S_{\beta\gamma1} = \beta_1 - \beta_1 \quad (17)$$

$$S_{\gamma\alpha1} = \gamma_1 - \alpha_1 \quad (18)$$

A phase $\phi_1$ may be determined according to star configuration methods disclosed in U.S. Pat. No. 6,005,387, which is hereby incorporated by reference herein in its entirety. The phase $\phi_1$ is given by the relation:

$$\phi_1 = \tan^{-1} \frac{1}{\sqrt{3}} \left( \frac{S_{\beta\gamma1} - S_{\gamma\alpha1}}{S_{\alpha\beta1}} \right) \quad (19)$$

FIG. 6B is a schematic diagram of a set of second wavelength sensing elements 622 of the detector 620 which may be used in the electronic absolute position encoder 600. The set of second wavelength sensing elements 622 comprises a first filtering subset of second wavelength sensing elements 624 that each span across the first and second pattern components 111 and 112, and a second filtering subset of second wavelength sensing elements 624' that each span across the first and second pattern components 111 and 112. As shown in FIG. 6B, the first filtering subset of second wavelength sensing elements 624 comprises sensing elements configured to sample phase signals $A_1$, $B_1$, and $C_1$ along the measuring axis direction. More specifically, the phase signals $A_1$, $B_1$, and $C_1$ correspond to 0, 120 and 240 degrees with respect to the second wavelength $\lambda_2$. The second filtering subset of second wavelength sensing elements 624' comprises sensing elements configured to sample phase signals $A_1'$, $B_1'$, and $C_1'$ along the measuring axis direction, in that particular order. More specifically, the phase signals $A_1'$, $B_1'$, and $C_1'$ correspond to 0, 120 and 240 degrees with respect to the second wavelength $\lambda_2$. The first filtering subset of second wavelength sensing elements 624 and the second filtering subset of second wavelength sensing elements 624' comprise sensing elements spaced a distance $\lambda_2/3$ apart. The phase signals $A_2$, $B_2$, $C_2$, $A_2'$, $B_2'$, and $C_2'$ may be combined to provide three combined phase signals $\alpha_2$, $\beta_2$ and $\gamma_2$ according to the relations:

$$\alpha_2 = A_2 - A_2' \quad (20)$$

$$\beta_2 = B_2 - B_2' \quad (21)$$

$$\gamma_2 = C_2 - C_2' \quad (22)$$

The three combined phase signals may be used to provide three star configuration signals $S_{\alpha\beta2}$, $S_{\beta\gamma2}$ and $S_{\gamma\alpha2}$ according to the relations:

$$S_{\alpha\beta2} = \alpha_2 - \beta_2 \quad (23)$$

$$S_{\beta\gamma2} = \beta_2 - \gamma_2 \quad (24)$$

$$S_{\gamma\alpha2} = \gamma_2 - \alpha_2 \quad (25)$$

A phase $\phi_2$ may be determined according to the same method as Equation 11. The phase $\phi_2$ is given by the relation:

$$\phi_2 = \tan^{-1} \frac{1}{\sqrt{3}} \left( \frac{S_{\beta\gamma2} - S_{\gamma\alpha2}}{S_{\alpha\beta2}} \right) \quad (26)$$

FIG. 7 is a schematic diagram showing the construction of a scale 710 which may be used in a second embodiment of an electronic absolute position encoder 700. The scale 710 includes a signal modulating scale pattern comprising a first periodic pattern component 711 as a function of position along the scale having a spatial wavelength $\lambda_1$, and a seconds periodic pattern component 712 as a function of position along the scale having a spatial wavelength $\lambda_2$. Both the first periodic pattern component 711 and the second periodic pattern component 712 are shown separately to indicate their basic pattern. The scale 710 is shown with both patterns the first periodic pattern component 711 and the second periodic pattern component 712 in the same region. The scale 710 comprises a first flat substrate that extends along the measuring axis direction and the first periodic pattern component 711 and the second periodic pattern component 712 are formed along the measuring axis direction MA of the scale 710. The sensing elements each comprise an approximately planar loop winding formed on a second flat substrate arranged proximate to the first flat substrate with a gap therebetween, and each sensing element is relatively shorter along the measuring axis direction MA and relatively longer along a direction transverse to the measuring axis direction MA, and each sensing element spans across the first and second pattern components 711 and 712 along the direction transverse to the measuring axis direction MA. The first periodic pattern component 711 and the second periodic pattern component 712 are formed from a second material fabricated on or embedded in the substrate. The second material has a different magnetic property than the first material. In some embodiments, the first periodic pattern component 711 and the second periodic pattern component 712 may be manufactured in different layers on the substrate. In some embodiments, the scale 710 may comprise a PCB substrate with the first periodic pattern component 711 and the second periodic pattern component 712 provided as a copper trace. The first periodic pattern component 711 and the second periodic pattern component 712 are formed superimposed in a single track along the measuring axis direction. It should be appreciated that in alternative embodiments, a first periodic pattern component and a second periodic pattern component may be formed in separate tracks along the measuring axis direction MA, where sensing elements of a detector span both of the separate tracks.

Figure 8:
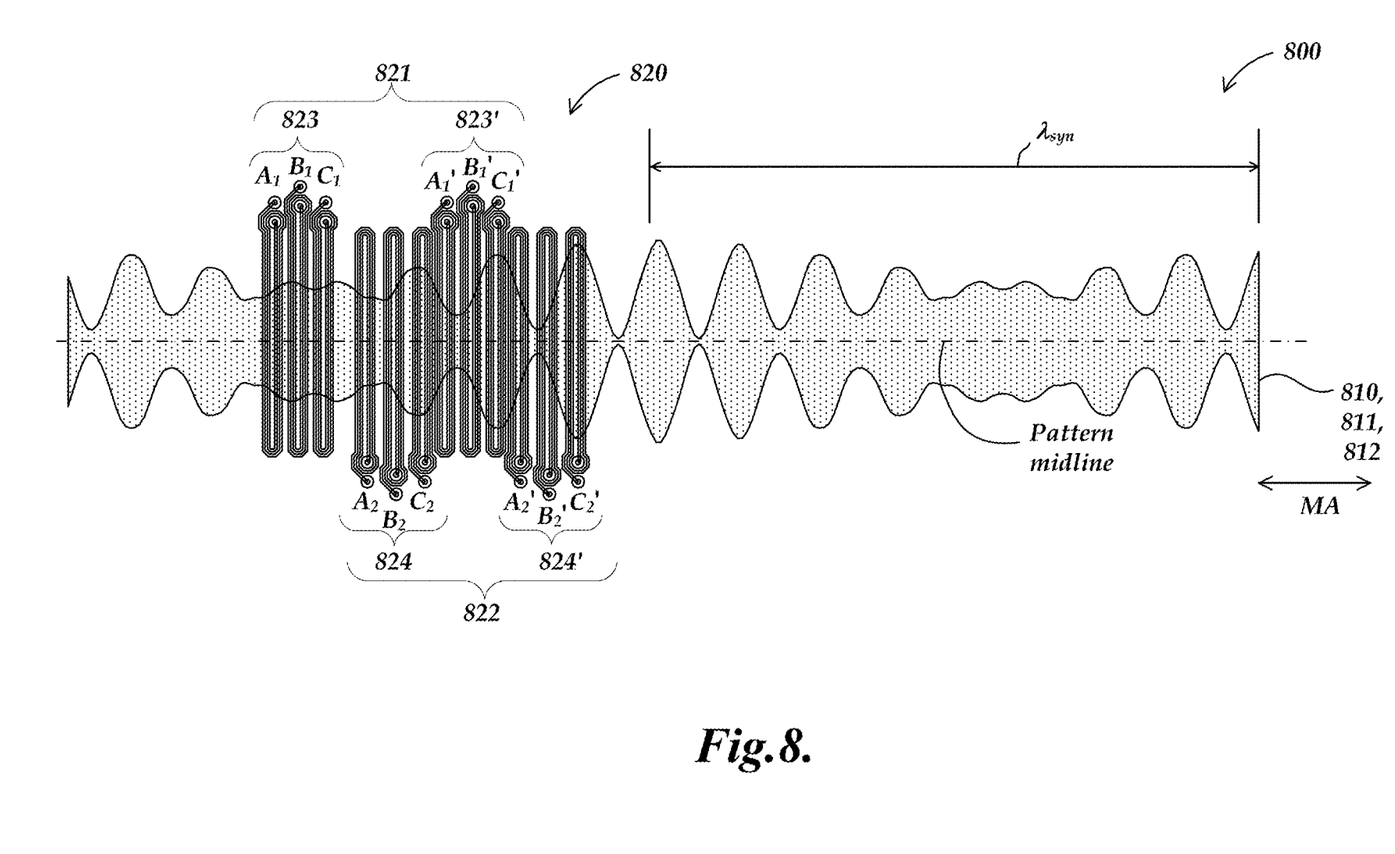
FIG. 8 is a diagram showing a scale and a detector which may be used in a third embodiment of an electronic absolute position encoder.

FIG. 8 is a diagram showing a scale 810 and a detector 820 which may be used in a third embodiment of an electronic absolute position encoder 800. The scale 810 includes a signal modulating scale pattern comprising a first periodic pattern component 811 as a function of position along the scale having a spatial wavelength $\lambda_1$, and a second periodic pattern component 812 as a function of position along the scale having a spatial wavelength $\lambda_2$. More specifically, the width of the signal modulating scale pattern varies according to a superposition of two sinusoids with spatial wavelengths $\lambda_1$ and $\lambda_2$.

The detector 820 comprises a three phase system, which is similar to the detector 620 and is an interleaved arrangement of a set of first wavelength sensing elements 821 and a set of second wavelength sensing elements 822. The set of first wavelength sensing elements 821 comprises a first filtering subset of first wavelength sensing elements 823 and a second filtering subset of first wavelength sensing elements 823'. The set of second wavelength sensing elements 822 comprises a first filtering subset of second wavelength sensing elements 824 and a second filtering subset of second wavelength sensing elements 824A'. The interleaved arrangement of the detector 820 is analogous to that of the detector 320B, and provides a compact detector configuration which solves potential space constraint issues.

The pattern formed by the first periodic pattern component 811 and the second periodic pattern component 812 superimposed in a single track along the measuring axis direction MA is a pattern that is symmetric with respect to a midline of the pattern that extends along the measuring axis direction MA.

Various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electronic absolute position encoder, the electronic absolute position encoder comprising:
   a scale extending along a measuring axis direction and including a signal modulating scale pattern comprising a first periodic pattern component as a function of position along the scale having a spatial wavelength $\lambda_1$, and a second periodic pattern component as a function of position along the scale having a spatial wavelength $\lambda_2$;
   a detector comprising sensing elements arranged along the measuring axis direction, the sensing elements comprising:
      a set of first wavelength sensing elements configured to provide a first set of detector signals which respond to the signal modulating scale pattern; and
      a set of second wavelength sensing elements configured to provide a second set of detector signals which respond to the signal modulating scale pattern; and
   a signal processing configuration that determines an absolute position of the detector along the scale based on detector signals provided by the detector, wherein:
the set of first wavelength sensing elements comprises:
a first filtering subset of the set of first wavelength sensing elements that each span across the first and second pattern components; and
a second filtering subset of the set of first wavelength sensing elements that each span across the first and second pattern components;
wherein the first and second filtering subsets of the set of first wavelength sensing elements are arranged such that each sensing element of the first filtering subset forms a complementary pair with a sensing element in the second filtering subset that is spaced apart from it along the measuring axis direction by an integer number times 180 degrees of spatial phase difference in terms of the spatial wavelength $\lambda_2$; and
the set of second wavelength sensing elements comprises:
a first filtering subset of the set of second wavelength sensing elements that each span across the first and second pattern components; and
a second filtering subset of the set of second wavelength sensing elements that each span across the first and second pattern components;
wherein the first and second filtering subsets of the set of second wavelength sensing elements are arranged such that each sensing element of the first filtering subset forms a complementary pair with a sensing element in the second filtering subset that is spaced apart from it along the measuring axis direction by an integer number times 180 degrees of spatial phase difference in terms of the spatial wavelength $\lambda_1$.

2. The electronic absolute position encoder of claim 1, wherein:
the signal processing configuration is configured to process the first set of detector signals to provide first wavelength spatial phase measurement signals wherein signal components due to the second periodic pattern component are suppressed, and to process the second set of detector signals to provide second wavelength spatial phase measurement signals wherein signal components due to the first periodic pattern component are suppressed.

3. The electronic absolute position encoder of claim 2, wherein:
the signal processing configuration is configured to process the first wavelength spatial phase measurement signals and determine a spatial phase measurement for the set of first wavelength sensing elements relative to the spatial wavelength $\lambda_1$, and to process the second wavelength spatial phase measurement signals and determine a spatial phase measurement for the set of second wavelength sensing elements relative to the spatial wavelength $\lambda_2$.

4. The electronic absolute position encoder of claim 1, wherein:
the sensing elements in each complementary pair of the set of first wavelength sensing elements are spaced apart at K1*180 degrees of spatial phase difference in terms of the spatial wavelength $\lambda_2$, where K1 is an integer; and
the sensing elements in each complementary pair of the set of second wavelength sensing elements are spaced apart at K2*180 degrees of spatial phase difference in terms of the spatial wavelength $\lambda_1$, where K2 is an integer.

5. The electronic absolute position encoder of claim 4, wherein K1 and K2 are even integers.

6. The electronic absolute position encoder of claim 5, wherein:
the signal processing configuration is configured to provide a difference signal between signals arising in the sensing elements of each complementary pair;
the difference signals of the set of first wavelength sensing elements provide first wavelength spatial phase measurement signals wherein signal components due to the second periodic pattern component are suppressed;
the difference signals of the set of second wavelength sensing elements provide second wavelength spatial phase measurement signals wherein signal components due to the first periodic pattern component are suppressed; and
the signal processing configuration is configured to process the first wavelength spatial phase measurement signals and determine a spatial phase measurement for the set of first wavelength sensing elements relative to the spatial wavelength $\lambda_1$, and to process the second wavelength spatial phase measurement signals and determine a spatial phase measurement for the set of second wavelength sensing elements relative to the spatial wavelength $\lambda_2$.

7. The electronic absolute position encoder of claim 1, wherein:
the set of first wavelength sensing elements is configured to provide detector signals corresponding to N spatial phases spaced apart at 360/N degrees of spatial phase difference in terms of the spatial wavelength $\lambda_1$; and
the set of second wavelength sensing elements is configured to provide detector signals comprising a second set of N detector signals corresponding to N unique spatial phases spaced apart at 360/N degrees of spatial phase difference in terms of the spatial wavelength $\lambda_2$.

8. The electronic absolute position encoder of claim 7, wherein N=3.

9. The electronic absolute position encoder of claim 7, wherein N=4.

10. The electronic absolute position encoder of claim 7, wherein:
the first filtering subset of the set of first wavelength sensing elements comprises N sensing elements spaced a distance $\lambda_1$/N apart; and
the first filtering subset of the set of second wavelength sensing elements comprises N sensing elements spaced a distance $\lambda_2$/N apart.

11. The electronic absolute position encoder of claim 1, wherein:
the scale comprises a cylindrical shape having a cylinder axis aligned parallel to the measuring axis direction with the first periodic pattern component formed as notches or grooves arranged along the scale and the second periodic pattern component formed as notches or grooves arranged along the scale; and
the sensing elements comprise loops which encircle the scale.

12. The electronic absolute position encoder of claim 11, wherein the first and second periodic pattern components comprise notches formed in respective first and second tracks along the scale.

13. The electronic absolute position encoder of claim 1, wherein:
the scale comprises a flat substrate comprising a first material; and
the first periodic pattern component and the second periodic pattern component are formed from a second material fabricated on or embedded in the flat substrate, the second material having a different magnetic property than the first material.

14. The electronic absolute position encoder of claim 1, wherein:
the scale comprises a first flat substrate that extends along the measuring axis direction and the first periodic pattern component and the second periodic pattern component are formed along the measuring axis direction of the scale; and
the sensing elements each comprise an approximately planar loop winding formed on a second flat substrate arranged proximate to the first flat substrate with a gap therebetween, and each sensing element is relatively shorter along the measuring axis direction and relatively longer along a direction transverse to the measuring axis direction, and each sensing element spans across the first and second pattern components along the direction transverse to the measuring axis direction.

15. The electronic absolute position encoder of claim 14, wherein:
the first periodic pattern component and the second periodic pattern component are formed in separate tracks along the measuring axis direction.

16. The electronic absolute position encoder of claim 14, wherein:
the first periodic pattern component and the second periodic pattern component are formed superimposed in a single track along the measuring axis direction.

17. The electronic absolute position encoder of claim 16, wherein a pattern formed when the first periodic pattern component and the second periodic pattern component are superimposed in a single track along the measuring axis direction is a pattern that is symmetric with respect to a midline of a pattern that extends along the measuring axis direction.

18. The electronic absolute position encoder of claim 1, wherein the sensing elements of the detector comprise electromagnetic windings which are configured to provide detector signals that are responsive to a change in inductance sensed by the electromagnetic windings as a function of position along the signal modulating scale pattern.

19. The electronic absolute position encoder of claim 18, wherein the detector and the scale are configured as an eddy current transducer which operates by generating changing magnetic fields.

20. The electronic absolute position encoder of claim 1, wherein the first filtering subset of the set of second wavelength sensing elements is arranged between the first filtering subset of the set of first wavelength sensing elements and the second filtering subset of first wavelength sensing elements along the measuring axis direction.

* * * * *